(12) United States Patent
Bocq et al.

(10) Patent No.: US 7,529,840 B2
(45) Date of Patent: May 5, 2009

(54) HTTP USE FOR BIDIRECTIONAL COMMUNICATION

(75) Inventors: Sébastien John Marcel Ghislain Bocq, Woluwe-Saint-Lambert (BE); Steve Roman Michel Van Den Berghe, Melle (BE)

(73) Assignee: Alcatel, Paris (FR)

( * ) Notice: Subject to any disclaimer, the term of this patent is extended or adjusted under 35 U.S.C. 154(b) by 404 days.

(21) Appl. No.: 11/362,814

(22) Filed: Feb. 28, 2006

(65) Prior Publication Data

US 2006/0195592 A1    Aug. 31, 2006

(30) Foreign Application Priority Data

Feb. 28, 2005  (EP)  ................................. 05290453

(51) Int. Cl.
*G06F 15/16*    (2006.01)
(52) U.S. Cl. ........................................ 709/227; 709/217
(58) Field of Classification Search ........................ None
See application file for complete search history.

(56) References Cited

U.S. PATENT DOCUMENTS

2004/0143665 A1    7/2004  Mace et al.
2004/0148328 A1*   7/2004  Matsushima ................ 709/200
2005/0027871 A1*   2/2005  Bradley et al. ............... 709/227

OTHER PUBLICATIONS

M. Gudgin et al, "Soap Version 1.2 part 2: Adjuncts" Internet Article, Online!, Jun. 24, 2003, pp. 1-59, XP0022335583.
Technical Report—DSL Forum TR-069—CPE WAN Management Protocol, May 2004 pp. 1-109.

* cited by examiner

*Primary Examiner*—Ario Etienne
*Assistant Examiner*—Clayton R Williams
(74) *Attorney, Agent, or Firm*—Sughrue Mion, PLLC

(57) ABSTRACT

A method to transfer data in a telecommunication network between a first host (HOST A) and a second host (HOST B) via Standard Toolkit Software Components, HTTP Session Managers and a Transport medium. The data transfer is compliant with the SOAP 1.2 HTTP Bindings Specification, and comprises SOAP Requests sent by the first host into first HTTP Request message towards the Client Side as well as SOAP Responses sent by the second host into first HTTP Response message towards the Server Side. The method comprises the transfer of data through a HTTP Adaptation Layer adapted to load SOAP Requests sent by the second host into second HTTP Response messages towards the Server Side of the HTTP Session Manager, as well as SOAP Responses sent by the first host into second HTTP Request message towards the Client Side of the HTTP Session Manager. The new the HTTP Adaptation Layer either interfaces the HTTP Transport manager of the Standard Toolkit Software Components and the HTTP Session Manager, or replaces the HTTP Transport manager in the Standard Toolkit Software Components.

10 Claims, 3 Drawing Sheets

US 7,529,840 B2

HTTP USE FOR BIDIRECTIONAL COMMUNICATION

BACKGROUND OF THE INVENTION

1. Field of the Invention

The present invention relates to a method to transfer data in a telecommunication network between a first host and a second host via Standard Toolkit Software Components, a Client Side HTTP Session Manager associated to said first host, a Transport medium and a Server Side HTTP Session Manager associated to said second host, said Transport medium being adapted to transmit data from said Client Side HTTP Session Manager to said Server Side HTTP Session Manager, said data transfer being compliant with the Simple Object Access Protocol SOAP 1.2 HTTP Bindings Specification, and comprising a first SOAP Request sent by said first host into a first HTTP Request message towards said Client Side HTTP Session Manager, as well as a first SOAP Response sent by said second host as reply to said first HTTP Request message into a first HTTP Response message towards said Server Side HTTP Session Manager.

2. Description of the Related Art

Such a method to transfer data in a telecommunication network, as shown at FIG. 1, is already generally known in the art.

SOAP [Simple Object Access Protocol] is widely used in the context of Web Services in the IT world. SOAP 1.2 HTTP [HyperText Transfer Protocol HTTP] Bindings Specification, for instance, is very popular and standardized for communication between distributed applications. Furthermore, Web Services have recently been standardized by the Web Services Interoperability organization WS-I in the Basic Profile 1.0.

As a result, many Toolkits and APIs (e.g. Apache™ AXIS [Apache eXtensible Interaction System] library) are developed for automating Web Services applications by providing:

Automated serialization/de-serialization to the object model (java/C++);
Use of a WSDL [Web Service Description Language] file that clearly specifies the Remote Procedure Call (RPC) interface between distributed applications and reduces programming errors;
Source Code generation from WSDL (Client Side);
WSDL generation from the object model (Server Side);
Built-in Session management of the web service through the use of Web Services Deployment Descriptor; and
Automated mapping from Exceptions in the object model to SOAP Faults The Web Service Session management software provided by such Toolkits can be configured to run over several transport protocols among which HTTP is the most popular one.

To improve interoperability between peer applications when HTTP is used, the Session management software, and thus the Toolkits, requires compliance with SOAP 1.2 HTTP Bindings Specification that requires that a "SOAP Request" be sent in a "HTTP Request message" and a "SOAP Response" is received in a "HTTP Response message", as shown at FIG. 1.

However, when a HTTP Session is established through the transport medium between two hosts, SOAP 1.2 HTTP Bindings Specification specifies that a SOAP Request must be sent in a HTTP Request message and a SOAP Response must be received in a HTTP Response message. This implies that in a single HTTP Session, the Remote Procedure Call RPC exchange flow is unidirectional; only the HTTP initiator, the one that posts HTTP Request messages, can issue RPC Requests.

Although both HTTP target and initiator applications could theoretically handle SOAP RPCs in one single HTTP Session, they cannot be developed for using standard Toolkits because the SOAP Session management software provided by those Toolkits only expects unidirectional exchanges of SOAP Requests per established HTTP Session.

SUMMARY OF THE INVENTION

An object of the present invention is to let Web Services Applications developed using Standard Toolkit Software Components and HTTP Session Manager software compliant with the SOAP 1.2 HTTP Bindings Specification becoming alternatively either Web Service "Client" or Web Service "Server" over the same HTTP Session and exchanging bidirectional SOAP Remote Procedure Calls RPCs over this same HTTP Session.

According to the invention, this object is achieved due to the fact that said method further comprises the transfer of data through a HTTP Adaptation Layer adapted to load a second SOAP Request sent by said second host into a second HTTP Response message towards the Server Side HTTP Session Manager, as well as a second SOAP Response sent by said first host as reply to said second SOAP Request into a second HTTP Request message towards the Client Side HTTP Session Manager.

In this way, the HTTP Adaptation Layer works in conjunction with the Standard Toolkit Software Components without disrupting the Software Components provided by these Standard Toolkits. Indeed, the HTTP Adaptation Layer handles in a bidirectional way the existing HTTP Session established between each host, transparently with respect to the Standard Toolkit Software Components. The HTTP Adaptation Layer lets compliant SOAP Session management software issue RPCs from the second host towards the first host without opening any new HTTP Session. In other words, the HTTP Adaptation Layer is managing the HTTP Session going on between the two hosts and is able to:

Transfer messages received from the Standard Toolkit Software Components into HTTP Request messages or HTTP Response messages depending on the state of the underlying HTTP Session established between two peers, i.e. whether it expects a HTTP Request message or a HTTP Response message to be sent; and
Extract from the HTTP Request message or HTTP Response message received by the Transport medium messages carrying SOAP information as expected by the Standard Toolkit Software Components.

Another characterizing embodiment of the present invention is that said Standard Toolkit Software Components comprise a SOAP Engine and a SOAP/HTTP Transport manager, said SOAP Engine being coupled to said first host and to said second host as well as to said SOAP/HTTP Transport manager that is adapted to exchange SOAP Requests and SOAP Responses with said SOAP Engine and to exchange HTTP Request messages and HTTP Response messages with the HTTP Session Managers, said HTTP Adaptation Layer interfacing said SOAP/HTTP Transport manager and said HTTP Session Managers.

In this way, the HTTP Adaptation Layer works in conjunction with the Standard Toolkit Software Components below their Transport Level without disrupting the Software Components provided by these Standard Toolkits.

In more detail, said HTTP Adaptation Layer is adapted to transfer SOAP Requests carried in HTTP Request messages and SOAP Responses carried in HTTP Response messages between said HTTP Session Managers and said SOAP/HTTP Transport Manager, to place SOAP Requests carried in HTTP Response messages received from said Client Side HTTP Session Manager into HTTP Request messages prior to transfer them to said SOAP/HTTP Transport Manager, to place SOAP Responses carried in HTTP Request messages received from said Server Side HTTP Session Manager into HTTP Response messages prior to transfer them to said SOAP/HTTP Transport Manager, to place SOAP Requests carried in HTTP Request messages received from said SOAP/HTTP Transport Manager into HTTP Response messages prior to transfer them to said Server Side HTTP Session Manager, and to place SOAP Responses carried in HTTP Response messages received from said SOAP/HTTP Transport Manager into HTTP Request messages prior to transfer them to said Client Side HTTP Session Manager.

In a variant characterizing embodiment of the present invention, said Standard Toolkit Software Components comprise a SOAP Engine coupled to said first host and to said second host, as well as said HTTP Adaptation Layer that is adapted to exchange SOAP Requests and SOAP Responses with said SOAP Engine and to exchange HTTP Request messages and HTTP Response messages with the HTTP Session Managers.

In this case, the HTTP Adaptation Layer works in conjunction with the Standard Toolkit Software Components at, rather than below, their transport level without disrupting the Software Components provided by these Standard Toolkits.

In this variant embodiment, said HTTP Adaptation Layer is adapted to place SOAP Requests and SOAP Responses of said first host into HTTP Request messages, and to place SOAP Requests and SOAP Responses of said second host into HTTP Response messages.

Further characterizing embodiments of the present method to transfer data in a telecommunication network are mentioned in the appended claims.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF EXEMPLARY EMBODIMENTS OF THE INVENTION

Figure 1:
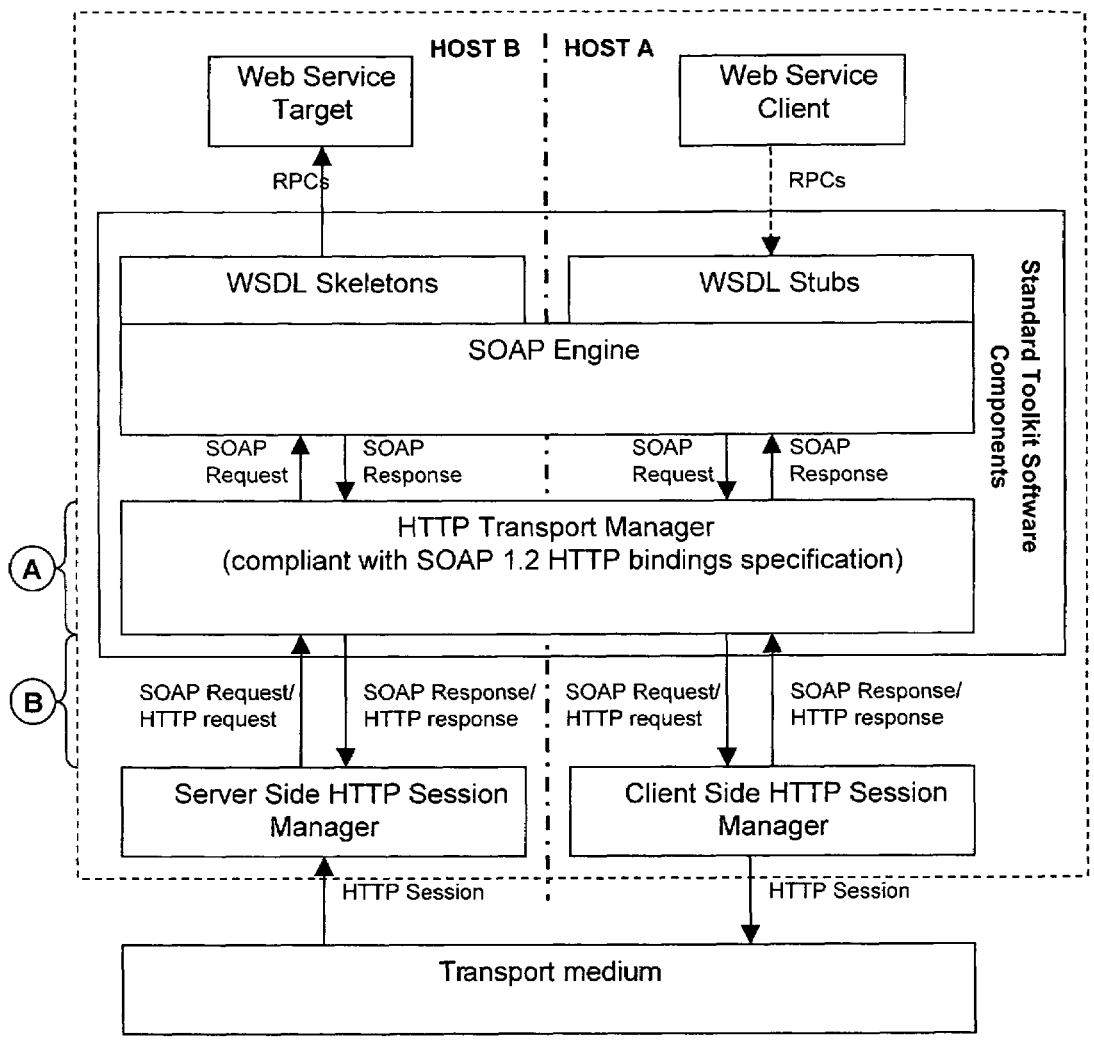
FIG. 1 shows a unidirectional SOAP Remote Procedure Call (RPC) over a HTTP Session compliant with 1.2 HTTP Bindings Specification, as known in the prior art.

A known transfer of data method used in a telecommunication network between a first HOST A and a second HOST B is illustrated at FIG. 1. Therein, is shown the path followed by messages exchanged between the two distributed client/server peer applications host A and host B using SOAP (Simple Object Access Protocol) Session Management software, preferably according to SOAP 1.2 HTTP (HyperText Transfer Protocol) Bindings Specification and other Standard Toolkit Software Components like WSDL (Web Services Description Language) stubs and WSDL skeletons. The HTTP Session is established from host A, called HTTP Session initiator, to host B, called HTTP Session target, meaning that only host A can issue HTTP Request messages RPC (Remote Procedure Call), as described in the TR-069 Protocol Management.

The FIG. 1 shows a SOAP Request sent over a HTTP Request message by the Web Service Client application running on host A, and a SOAP Response that is conveyed back by the Web Service Target application running on host B into a HTTP Response message, as known in the art.

In more detail, the Web Service Client running on host A sends a RPC to the WSDL Stubs of Standard Toolkit Software Components. The latter Standard Toolkit Software Components comprise a SOAP Engine associated to the WSDL Stubs and the WSDL Skeletons as well as a HTTP Transport Manager coupled to the SOAP Engine and compliant with SOAP 1.2 HTTP Bindings Specifications. As a result of the RPC, the SOAP Engine transmits a SOAP Request to the HTTP Transport Manager. The HTTP Transport Manager then transmits a SOAP Request/HTTP Request to a Client Side of the HTTP Session Manager. The resulting HTTP Session is transmitted through a Transport Medium to a Server Side of the HTTP Session Manager. In turn, the HTTP Session Manager transmits a SOAP Request/HTTP Request to the HTTP Transport Manager that transfers the SOAP Request to the WSDL Skeletons via the SOAP Engine. The Web Service Target running on host B receives a RPC from the WSDL Skeletons of Standard Toolkit Software Components.

At the target host B side, a SOAP Response may be initiated from the SOAP Engine towards the HTTP Transport Manager that transmits a SOAP Response/HTTP Response to the Server Side of the HTTP Session Manager. This SOAP Response/HTTP Response is transmitted to HTTP Transport Manager via the Client side of the HTTP Session Manager and the HTTP Session through the Transport Medium. The HTTP Session Manager then provides the SOAP Response to the SOAP Engine at the Client host A side.

The SOAP 1.2 HTTP Bindings Specification specifies that, when a HTTP Session is established through the transport medium between two hosts, a SOAP Request must be sent in a HTTP Request message and a SOAP Response must be received in a HTTP Response message. This implies that in this single HTTP Session, the RPC exchange flow is unidirectional: only the HTTP Session initiator, i.e. host A, that posts HTTP Request messages, can issue RPC Requests.

Figure 2:
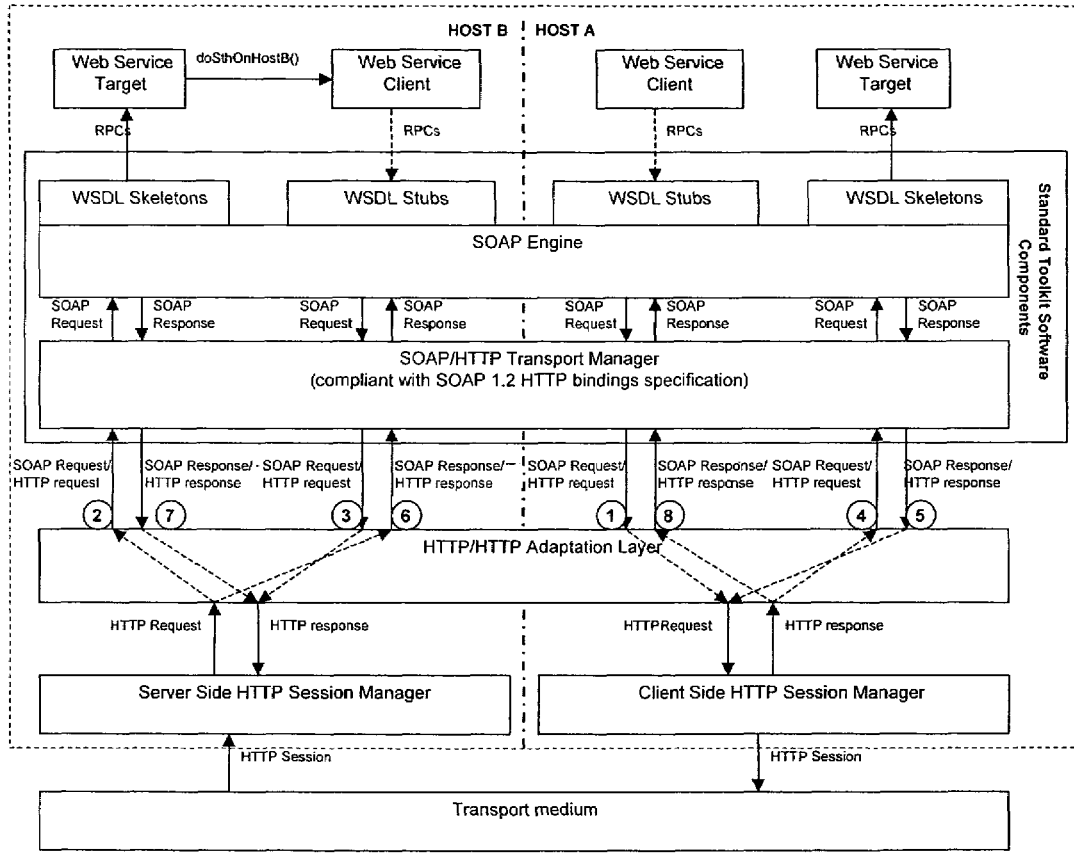
FIG. 2 shows a bidirectional SOAP RPC over a single HTTP Session according to the invention and wherein the HTTP Adaptation Layer is located below the Toolkit's HTTP Transport Manager.
Figure 3:
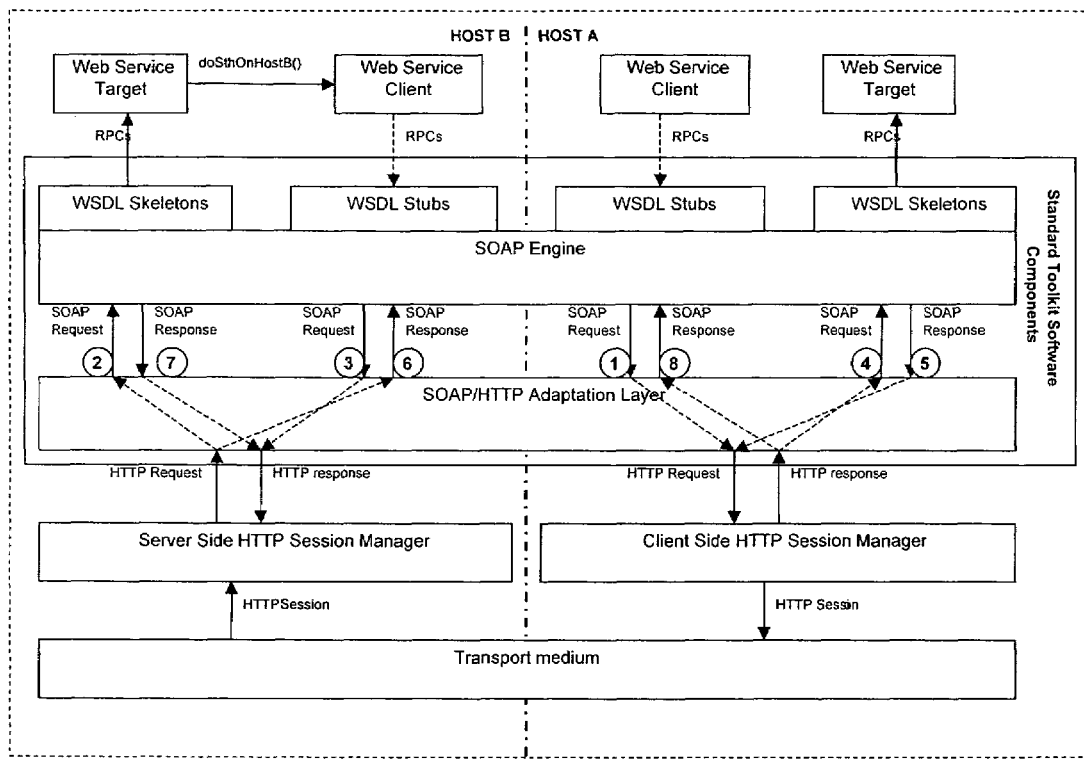
FIG. 3 shows a bidirectional SOAP RPC over a single HTTP Session according to the invention and wherein the HTTP Adaptation Layer replaces the Toolkit's HTTP Transport Manager.

Improved embodiments realized according to the present invention are shown at the FIGS. 2 and 3. The improvement consists in a HTTP Adaptation Layer that handles the HTTP Session established between each host transparently with respect to the Standard Toolkit Software Components. It lets compliant SOAP Session Management Software issue RPCs to another host without opening a new HTTP Session to it, the only restriction being that a HTTP Session has already been established from that other host.

There are two integrations of the HTTP Adaptation Layer with Standard Toolkits Software Components:

I. Either it acts below the HTTP Transport Manager of the Toolkit, as shown at FIG. 2 and indicated by "B" at FIG. 1. In this case the HTTP Adaptation Layer is a HTTP/HTTP Adaptation Layer that must aggregate, transparently for the Toolkit, two unidirectional (from host A to host B, and inversely) SOAP RPCs flows expected by the upper layer, over a unidirectional HTTP Session between two distributed peers. This method does not require any adaptation of the Toolkit and follows the principle that the SOAP message received from the Toolkit, whatever the protocol it uses, is placed (possibly via conversion or tunneling) inside a HTTP Request message or HTTP Response message depending on the state of the HTTP Session;

II. Either it replaces the Transport Manager of the Toolkit, as shown at FIG. 3 and indicated by "A" at FIG. 1, if the Toolkit allows it. The HTTP Adaptation Layer is then a SOAP/HTTP Adaptation Layer that interacts directly with SOAP messages passed to/from the SOAP Engine. In this case, once a HTTP Session is established in one direction or another, the SOAP/HTTP Adaptation Layer decides whether a SOAP message coming from the SOAP Engine must be sent inside a HTTP Request message or a HTTP Response message to a peer and detects whether a HTTP message coming from a peer is carrying a SOAP Request or a SOAP Response.

Integration I as visualized at FIG. 2 will be explained in more detail below. Integration II can easily be deduced thereof.

Supposing that a HTTP Session can only be established from host A to host B, the behavior of the peer HTTP Adaptation Layers on each host is symmetrical and follows the steps summarized hereafter and shown in little circles on FIG. 2 indicated between bracket in the description below.

(1) The HTTP Adaptation Layer on host A, following a SOAP Request received from the upper layer (1), initiates a HTTP Session towards host B, if none exists, and sends a HTTP Request message carrying a SOAP RPC Request received from the upper SOAP/HTTP Transport Manager layer to host B.

(2) The HTTP Adaptation Layer on host B, upon receiving the HTTP Request message carrying the SOAP RPC Request from host A, forwards it to the upper SOAP/HTTP Transport Manager layer.

When handling the SOAP Request, called 'doSthOnHostB ()', the application running on host B can start issuing at its turn several SOAP RPCs towards host A. Each of these Requests follows the steps from (3) to (6) below.

(3) An application running on host B issues a SOAP RPC Request to host A. The HTTP Adaptation Layer will then place the SOAP RPC Request embedded in the HTTP Request message received from the upper layer into the HTTP Response message expected by host A from step (1).

(4) The HTTP Adaptation Layer on host A receives a HTTP Response message carrying a SOAP RPC Request from host B. It detects that it is carries a SOAP RPC Request and places it into a forged HTTP Request message from host B that it relays to the upper layer.

(5) After the RPC is handled by the Web Service application on host A, the HTTP Adaptation Layer transfers the SOAP RPC Response received in a HTTP Response message from the upper layer as a result of step (4) into a HTTP Request message that it sends to host B.

(6) The HTTP Adaptation Layer on host B receives a HTTP Request message carrying a SOAP Response from host A. It detects that it carries a SOAP Response and places it into a forged HTTP Response message as expected by the upper layer from step (3).

Once the 'doSthOnHostB( )' RPC performed all its tasks, including the sending of RPCs to host A, the message handling can proceed from step (2) and return the SOAP Response resulting from that RPC to host A.

(7) The HTTP Adaptation Layer on host B forwards the SOAP Response messages received by the upper layer as a result of step (2) to host A.

(8) The HTTP Adaptation Layer on host A receives the compliant HTTP Response message messages carrying a SOAP RPC Response from host B and transfers it to the upper layer which close the exchange.

Note that this process is recursive and that nothing prevents the application handling the RPC Request at step (4) from issuing at its turn a new RPC Request to host B implying that a whole new cycle from step (1) to step (8) can occur, and so on.

As a result of transferring data through the HTTP Adaptation Layer, the flexibility of SOAP client/server applications is increased while profiting from the use of SOAP 1.2 HTTP Bindings Specification compliant Web Services Toolkits offering that provide the following:

Rapid application development for both Web Service client and server developers, because Web Services Toolkits become available;

Use of a WSDL minimizes interoperability issues between clients and servers;

Web Services specific security packages become available for securing Web Service communications;

UDDI (Universal Discovery Description & Integration) can be used as a registry: the server publishes it's service and the client can look it up, there is thus no longer a need to preconfigure the client where the server is located;

Deployability increases, e.g. new server software releases can be deployed remotely through firewalls.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A method to transfer data in a telecommunication network between a first host and a second host via Standard Toolkit Software Components, a Client Side HTTP Session Manager associated to said first host, a Transport medium and a Server Side HTTP Session Manager associated to said second host, said Transport medium being adapted to transmit data from said Client Side HTTP Session Manager to said Server Side HTTP Session Manager, said data transfer being compliant with the Simple Object Access Protocol SOAP 1.2 HTTP Bindings Specification, and comprising a first SOAP Request sent by said first host into a first HTTP Request message towards said Client Side HTTP Session Manager, as well as a first SOAP Response sent by said second host as reply to said first HTTP Request message into a first HTTP Response message towards said Server Side HTTP Session Manager, wherein:

said method further comprises the transfer of data through a HTTP Adaptation Layer adapted to load a second SOAP Request sent by said second host into a second HTTP Response message towards the Server Side HTTP Session Manager, as well as a second SOAP Response sent by said first host as reply to said second SOAP Request into a second HTTP Request message towards the Client Side HTTP Session Manager; and said Standard Toolkit Software Components comprise a SOAP Engine coupled to said first host and to said second host as well as to one of a SOAP/HTTP Transport manager and said HTTP Adaptation Layer.

2. The method according to claim 1 wherein said SOAP/HTTP Transport manager is adapted to exchange SOAP Requests and SOAP Responses with said SOAP Engine and to exchange HTTP Request messages and HTTP Response messages with the HTTP Session Managers, said HTTP Adaptation Layer interfacing said SOAP/HTTP Transport manager and said HTTP Session Managers.

3. The method according to claim 2, wherein said HTTP Adaptation Layer is adapted to transfer SOAP Requests carried in HTTP Request messages and SOAP Responses carried in HTTP Response messages between said HTTP Session Managers and said SOAP/HTTP Transport Manager, to place SOAP Requests carried in HTTP Response messages received from said Client Side HTTP Session Manager into HTTP Request messages prior to transferring them to said SOAP/HTTP Transport Manager, to place SOAP Responses carried in HTTP Request messages received from said Server Side HTTP Session Manager into HTTP Response messages prior to transferring them to said SOAP/HTTP Transport Manager, to place SOAP Requests carried in HTTP Request messages received from said SOAP/HTTP Transport Manager into HTTP Response messages prior to transferring them to said Server Side HTTP Session Manager, and to place SOAP Responses carried in HTTP Response messages received from said SOAP/HTTP Transport Manager into HTTP Request messages prior to transferring them to said Client Side HTTP Session Manager.

4. The method according to claim 1, wherein said HTTP Adaptation Layer is adapted to exchange SOAP Requests and SOAP Responses with said SOAP Engine and to exchange HTTP Request messages and HTTP Response messages with the HTTP Session Managers.

5. The method according to claim 4, wherein said HTTP Adaptation Layer is adapted to place SOAP Requests and SOAP Responses of said first host into HTTP Request messages, and to place SOAP Requests and SOAP Responses of said second host into HTTP Response messages.

6. A method to transfer data in a telecommunication network between a first host and a second host, the method comprising:

sending by said first host a first Simple Object Access Protocol (SOAP) Request placed into a first HTTP Request message;

sending by said second host a first SOAP Response as a reply to said first HTTP Request message, where the first SOAP Response is placed into a first HTTP Response message;

transferring said first SOAP Request and said first SOAP Response through a HTTP Adaptation Layer that is configured to load a second SOAP Request sent by said second host into a second HTTP Response message and configured to load a second SOAP Response sent by said first host as reply to said second SOAP Request into a second HTTP Request message, wherein a SOAP Engine is coupled to said first host and to said second host and to one of a SOAP/HTTP Transport manager and said HTTP Adaptation Layer.

7. The method according to claim 6, wherein said SOAP/HTTP Transport manager is configured to exchange SOAP Requests and SOAP Responses with said SOAP Engine and to exchange HTTP Request messages and HTTP Response messages with HTTP Session Managers, and wherein said HTTP Adaptation Layer interfaces said SOAP/HTTP Transport manager and said HTTP Session Managers.

8. The method according to claim 7, wherein said HTTP Adaptation Layer is configured to:

transfer SOAP Requests carried in HTTP Request messages and SOAP Responses carried in HTTP Response messages between said HTTP Session Managers and said SOAP/HTTP Transport Manager, place SOAP Requests carried in HTTP Response messages received from said Client Side HTTP Session Manager into HTTP Request messages prior to transferring said SOAP Requests to said SOAP/HTTP Transport Manager, place SOAP Responses carried in HTTP Request messages received from said Server Side HTTP Session Manager into HTTP Response messages prior to transferring said SOAP Responses to said SOAP/HTTP Transport Manager, place SOAP Requests carried in HTTP Request messages received from said SOAP/HTTP Transport Manager into HTTP Response messages prior to transferring said SOAP Requests to said Server Side HTTP Session Manager, and place SOAP Responses carried in HTTP Response messages received from said SOAP/HTTP Transport Manager into HTTP Request messages prior to transferring said SOAP Responses to said Client Side HTTP Session Manager.

9. The method according to claim 6, wherein said HTTP Adaptation Layer is configured to exchange SOAP Requests and SOAP Responses with said SOAP Engine and to exchange HTTP Request messages and HTTP Response messages with HTTP Session Managers.

10. The method according to claim 9, wherein said HTTP Adaptation Layer is configured to:

place SOAP Requests and SOAP Responses of said first host into HTTP Request messages, and place SOAP Requests and SOAP Responses of said second host into HTTP Response messages.

* * * * *